(12) United States Patent
Nichols

(10) Patent No.: US 7,934,661 B2
(45) Date of Patent: May 3, 2011

(54) MARKETING/FUNDRAISING/REWARD SYSTEM AND METHOD

(76) Inventor: David Nichols, Armonk, NY (US)

(*) Notice: Subject to any disclaimer, the term of this patent is extended or adjusted under 35 U.S.C. 154(b) by 623 days.

(21) Appl. No.: 11/904,855

(22) Filed: Sep. 29, 2007

(65) Prior Publication Data

US 2008/0114611 A1    May 15, 2008

Related U.S. Application Data

(60) Provisional application No. 60/848,527, filed on Sep. 29, 2006.

(51) Int. Cl.
*G06K 19/06* (2006.01)
(52) U.S. Cl. ........................................ 235/494
(58) Field of Classification Search .............. 235/462.01, 235/494, 495
See application file for complete search history.

(56) References Cited

U.S. PATENT DOCUMENTS

| | | | | |
|---|---|---|---|---|
| 6,983,884 B2 * | 1/2006 | Auchinleck | | 235/385 |
| 7,111,777 B2 * | 9/2006 | Singhal | | 235/380 |
| 2006/0097041 A1 * | 5/2006 | Funamoto et al. | | 235/380 |

* cited by examiner

*Primary Examiner* — Seung H Lee

(57) ABSTRACT

Provided is a marketing/fundraising/reward method and system including providing a member with product with an incorporated authenticity tag including a personalized part, a unique number part, an encoded part, and a system identification section, assigning a unique number to be displayed in the unique number part, encoding the encoded part with the unique number, allowing the member to provide the personalized part, providing system identity information in the system identity section, providing a donation to a charity of the member's choosing, and recording information regarding the product, the donation, the personalized part, the unique number and the encoded part.

28 Claims, 3 Drawing Sheets

MARKETING/FUNDRAISING/REWARD SYSTEM AND METHOD

CROSS-REFERENCE TO RELATED APPLICATIONS

This application claims the benefit of U.S. Provisional Patent Application Ser. No. 60/848,527, filed Sep. 29, 2006, entitled "Marketing/Fundraising/Reward System," the entire disclosure of which is hereby incorporated by reference.

BACKGROUND OF THE INVENTION

Charities and brand holders are always looking for new ways to achieve awareness and to generate revenue. An example of this was the Lifestrong(™) bracelets for cancer research. These yellow bracelets generated tremendous awareness and high donation revenue.

Soon other charities began making their own bracelets, e.g., for breast cancer education and research. These charities sought the same awareness and revenue rewards as achieved by the Lifestrong(™) bracelets. A great variety of bracelets for various charities of various colors and designs were then available to members, who were often overwhelmed and confused by the numerous available choices.

With multiple bracelets coming out for different charities, it didn't take long for scammers to figure out that they too could benefit by making bracelets. First, the scammers started making bracelets with different names and colors which implied that a legitimate charity was involved although no valid charity was actually involved. The scammers then moved on to directly counterfeiting the charities bracelets themselves. This caused not only reduced revenue for the charities, but also dilution of the charities' brands and thus dilution of the perceived value of the bracelets themselves.

It is thus desirable for a marketing/fundraising/reward system and method to provide for a product having aesthetic appeal, attractive personalization, anti-counterfeiting measures, and ease of identifying the charity.

It is also desirable that a marketing/fundraising/reward system and method provide for ease of determining what cause the member is supporting, the level of a member's support to a charity and a means of displaying that level to others.

It is also desirable that a marketing/fundraising/reward system and method provides for easy accounting of and addition to a member's support to a charity, and for easily accounting for and verifying rewards to the member either immediately, online or by mail.

It is also desirable that a marketing/fundraising/reward system and method deters theft.

SUMMARY OF THE INVENTION

One aspect of the present invention provides a marketing/fundraising/reward method and system, including a product provided to a member, the product having an incorporated authenticity tag, the authenticity tag including a personalized part, a unique number part, an encoded part, and a system identification section. A unique number is assigned to be displayed in the unique number part. The encoded part is encoded with the unique number. The member is allowed to provide content for the personalized part. System identity information is provided in the system identity section. A donation is provided a charity of the member's choosing, and information regarding the product, the donation, the personalized part, the unique number and the encoded part is recorded.

Another aspect of the invention includes the described system and method in which the personalized part includes at least one of a name, a pseudonym, a symbol or an image.

Another aspect of the invention includes the described system and method in which the encoded part is one of a barcode, an RFID, or another electronic device.

Another aspect of the invention includes the described system and method in which the recording is performed over a computer network.

Another aspect of the invention includes the described system and method in which the computer network is the Internet and the recording is done using a website.

Another aspect of the invention includes the described system and method further including authenticating the product using the recorded product, donation, personalized part, unique number and encoded part information.

Another aspect of the invention includes the described system and method further including providing an additional donation to the member's chosen charity by another person using the personalized part information and the system identification information.

Another aspect of the invention includes the described system and method further including generating a web page listing recorded product, donation, personalized part and unique number information, and displaying the web page. The web page may also be printed.

Another aspect of the invention includes the described system and method, and further allowing the member to add to the amount of their purchased product, and updating the recorded information accordingly.

Another aspect of the invention further includes providing rewards to the member by another party based on the authenticity tag information.

In an aspect of the invention the recorded information may be searched for the provision of the product to the member and when the provision cannot be found, indicating so on a display.

A further aspect of the present invention provides that the product provided to the member is a funeral car flag, and the personalized information includes the decedent's name.

Another aspect of the invention provides that the charity may be a for profit enterprise.

DETAILED DESCRIPTION

"Member" as used herein means any customer or entity which purchases one or more product embodying the present inventive system or method, without limitation.

The present invention advantageously provides a marketing/fundraising/reward system and method for a product having aesthetic appeal, attractive personalization, anti-counterfeiting measures, and ease of identifying the charity.

The present invention also advantageously provides for ease of determining what cause a member is supporting, the level of a member's support to a charity and a means of displaying that level to others.

The present invention also advantageously provides easy accounting of and addition to a member's support to a charity, and for easy accounting and verification of rewards to the member either immediately, online or by mail.

Reference is made herein and in the accompanying Figures to the Boomerang(™) system and to its associated and registered Internet domain and website, BOOMERANG.ORG. The Boomerang(™) system and its website form an exemplary embodiment of the present invention, and references thereto are for illustrative purposes only.

Figure 1:
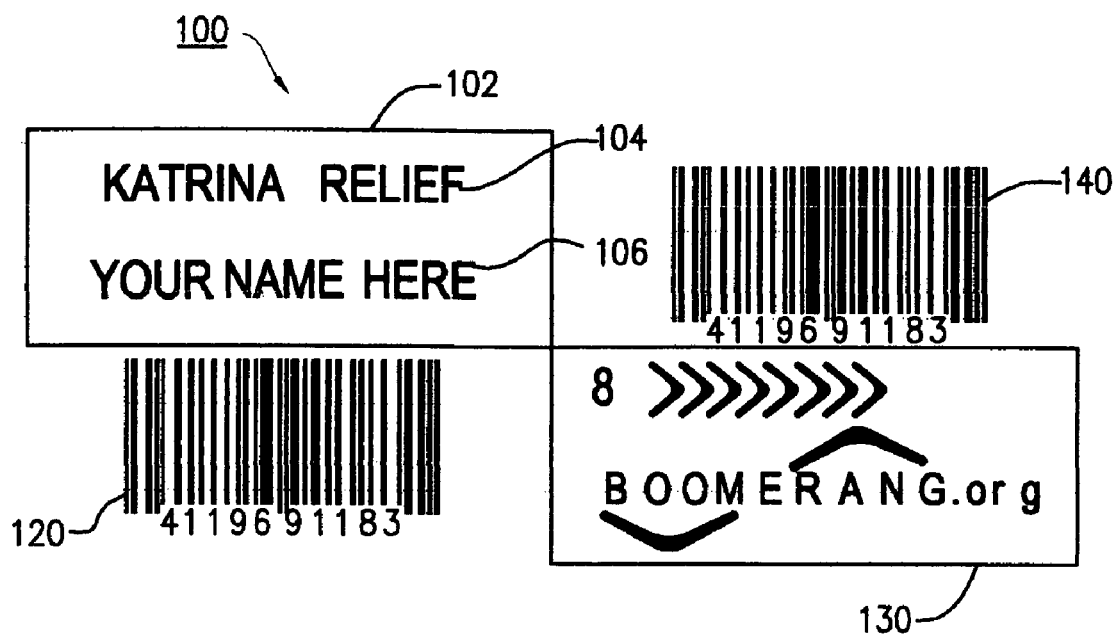
FIG. 1 is an illustration of a certificate of authenticity tag, in accordance with an embodiment of the present invention.

FIG. 1 is an illustration of a certificate of authenticity tag (hereinafter, "A-Tag") in accordance with an embodiment of the present invention. The A-Tag 100 is typically printed on cloth and affixed onto a product. Other means of generating an A-Tag are also envisioned. In an embodiment, the product includes a cause design, charity name, brand name or logo.

In an exemplary embodiment, an A-Tag 100 includes a personalized portion 102. As depicted in FIG. 1, the personalized portion 102 typically includes the name of the charity/donatee 104 for which the member 106 purchased the product to which the A-Tag is affixed (hereinafter, "charity"), as well as the name of the member 106. Alternatively, the member 106 may choose to use a pseudonym, symbol or other image instead of their name. Use of the term "charity" is intended in a very broad sense, and is not meant to imply that a "charity" must be non-profit. In some embodiments of the invention, it is anticipated that the role of charity will be taken on by a for-profit company or organization, wherein the fundraising aspect of the invention is overcome by the marketing aspect of the invention, and the organization may be interested in promoting a specific brand of merchandise.

The exemplary A-Tag 100 also includes one or more encoded sections, such as the two bar codes 120, 140 depicted in FIG. 1. In alternative embodiments, alternative encoded sections may be used, such as a 2-dimensional barcode, or an electronic device, such as an RFID (Radio Frequency Identification), a memory spot, or the like. The encoded section provides a unique identification number, which, as the name implies, may be encoded.

An exemplary A-Tag 100 also includes a system identification section 130. The system identification section 130 provides information to any viewer regarding the A-Tag system being used, and preferably includes a reference to a website or domain name at which a viewer may obtain additional information and execute other functions, as further described herein.

Figure 2:
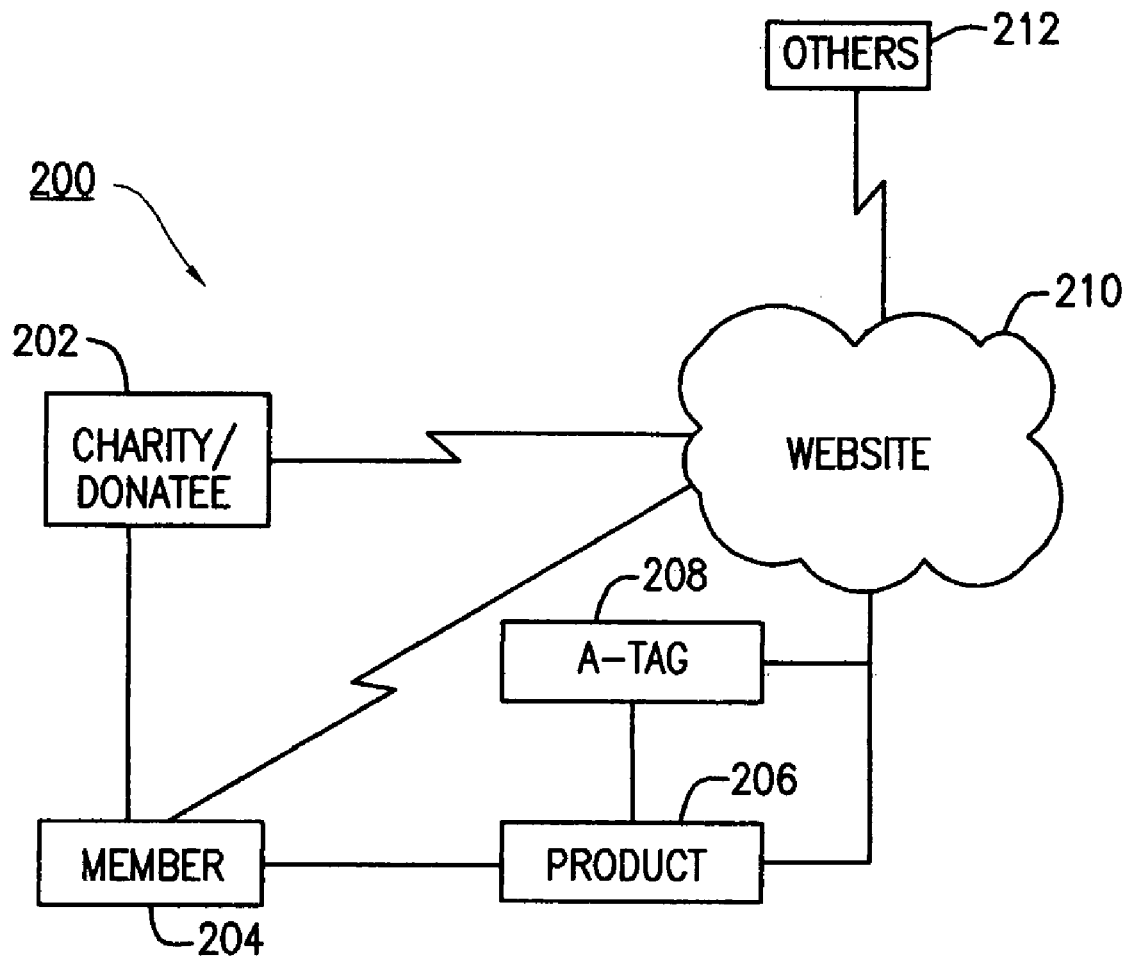
FIG. 2 is a schematic diagram of an exemplary marketing/fundraising/reward system in accordance with an embodiment of the present invention.

FIG. 2 depicts an exemplary embodiment of a marketing/fundraising/reward system in accordance with the present invention. The Boomerang(™) system 200 includes one or more charities/donatees 202, one or more members 204, one or more products 206 to be associated with the charities/donatees 202 and purchased or obtained by the members 204. It also includes A-Tags 208, product 210 and other information, and provides functions as further described hereinbelow. The Boomerang(™) system also provides for other persons or entities 212 to access the website 210 to perform various functions, as described herein.

Figure 3:
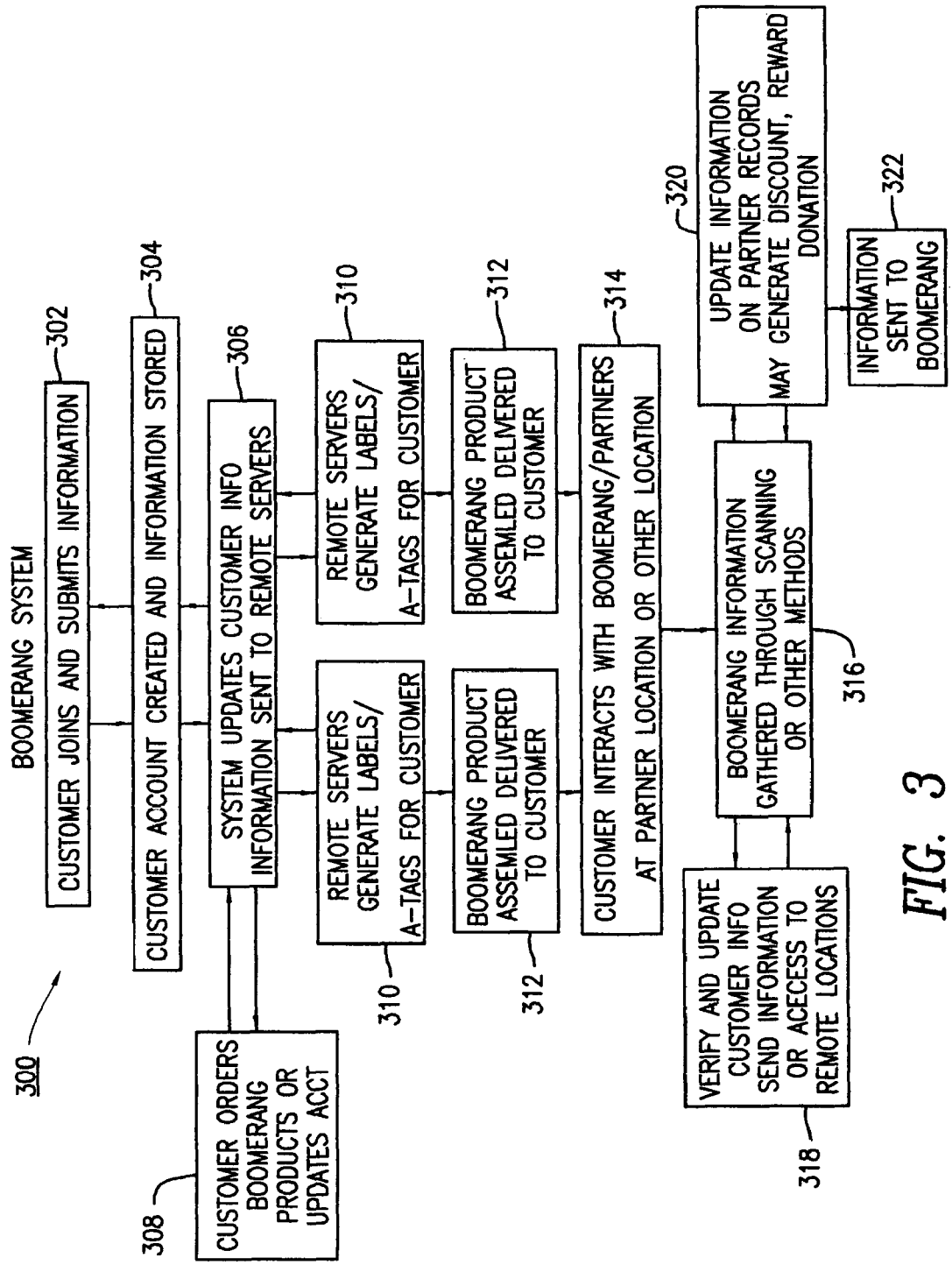
FIG. 3 is a flowchart of an exemplary embodiment of the method of the present invention.

FIG. 3 is a flowchart depicting a typical series of operations within a system in accordance with an embodiment of the present invention. In the Boomerang(™) system 300, a customer member joins and submits their information 302, which is used to create and store customer account information 304.

Next, the system updates the customer's information on its remote servers 306. This update also takes place whenever the customer orders Boomerang(™) products or updates their account information 308.

A time convenient for the customer or as appropriate for the system, the remote servers generate A-Tags for the customer as products are ordered 310. The Boomerang(™) product is then assembled together with it's associated A-Tag and delivered to the customer 312.

The customer may then interact with Boomerang(™) directly or through its partners at a partner or other location 314, and information is gathered through scanning or other methods 316. The collected information is then verified, and updated customer information is sent or access granted to remote locations 318.

At the partner site, the updated information on partner records may generate discounts, rewards or donations 320, which information is then transmitted to the Boomerang(™) system 322. In an embodiment, the A-Tags 100 and their barcodes 120, 140 or RFIDs lets the partner and the Boomerang(™) system 322 know what cause the member was wearing and thus what cause the partner should donate to.

Various advantages of systems in accordance with the present invention are illustrated in the following scenarios.

Scenario One—Anti-Counterfeiting:

Of particular importance are the methods used to limit counterfeiting. An embodiment of the present invention modifies the various products to be sold by adding several methods that will limit counterfeiting. For example, an exemplary product in accordance with the invention includes on its surface a place for a name, a pseudonym or picture, a unique identifying number and a corresponding barcode, RFID or similar device (hereinafter collectively referred to as an "encoded part") encoding the number to be placed. Additionally, when a member orders a product, the member's name or other self-reference may be placed on a web page listing next to the unique number assigned. A member may also register their purchase on such a website, on which member purchases may be tracked.

In one embodiment of the invention, members receive A-Tags. These A-Tags may contain RFID's, memory spots or other similar devices with separate codes and numbers on them. Various levels of security may then be assigned and selected involving any of the product, the label, and the A-Tag in order for a member to have additional contributions made to their cause and to be eligible for special rewards, discounts, prizes and acknowledgements or for other uses.

Various embodiments of the present invention prevent counterfeiting, which robs a brand holder or charity of revenue and diminishes the brand. For example, the present invention increases the time, cost and effort required to attempt to counterfeit products incorporating the invention by reproducing the customized names, numbers and encoded parts used. If a counterfeiter did succeed in generating a counterfeit, the inventive system and method provides for relatively easy locating and shutting down of the counterfeiter by refusing to provide rights by the charity or by an intellectual property action.

Additionally, embodiments of the invention diminish any interest a purchaser would have in purchasing a counterfeit item. If a purchaser was to purchase a fake item, such as a shirt, the purchaser runs the risk of being found out by a friend, neighbor or co-worker, who may look up the purchaser's displayed unique number on a website and see that the purchaser's item is in fact a counterfeit and that the purchaser did not contribute to a charity at all. The fraudulent purchase may also be discovered if the purchaser wore the shirt to get into a sponsored event, or tried to get a discount, reward or have additional contributions made to the charity. The embarrassment that would befall the purchaser and perhaps even their family for stealing from the charity would certainly not be worth any potential savings they would have received by buying the counterfeit product. The counterfeit product might easily be detected and charges brought against the purchaser and the counterfeiter. In this way, by limiting counterfeiting, all the money that is supposed to go to the charity will go to them, and the meaning and value of their products will remain high and intact.

Scenario Two—Anti-Theft:

Another advantage of the invention is to deter theft. In an embodiment, when a product using the inventive system and method is stolen, and the thief or later buyer attempts to use the stolen item, it would quickly become apparent to their friends and family that the item was stolen because the personalized information would not match that of the thief or later buyer. Since a preferred embodiment of the invention includes personalized information on the face of the product, such as a name or picture, the stolen nature of the product becomes quickly apparent. Additionally, because the items all have a unique visible number, it would be potentially worthwhile and easy for a theft to be reported and for police and others to spot the stolen item. A list of stolen items may also be posted on the website. Also, without the corresponding A-Tags or encoded part, such as an RFID, winning anything using the stolen item would not be possible, and in fact would increase the risk of the thief being caught. Any reported theft could be noted on the website listing, showing the whole world that the item is stolen, and in fact the item number could be rendered invalid, thereby depriving the thief of any additional benefits. This also protects the value for the charity.

Scenario Three—Ongoing Donations:

Another benefit of the invention would be the potential for ongoing donations to the charity. Most charity products sold provide a one-time donation to the charity generated at the time of purchase. Embodiments of the inventive product are designed so that corporations and individuals have a mechanism in place for ongoing donations to be made. For example, products launched to provide relief from the devastation caused by Hurricane Katrina may generate an immediate donation upon purchase. There would also be numerous ways to provide ongoing donations. For instance, a department store may have a day where for every customer coming to the store with one of the inventive products and being scanned therein, the store would make an additional contribution to the customer's cause. The store gets great publicity, is linked to one or more good causes and pulls customers into the store. The customer gets the satisfaction of knowing additional contributions are being made on their behalf just by their showing up, having or wearing the product or making a purchase. The charity, of course, benefits through additional donations.

Scenario Four—Rewards for the Purchaser:

Another benefit of the invention would be the potential to win prizes for owning/wearing a product incorporating the invention. They might win prizes such as gift cards, sample products from corporate sponsors, free concert or movie tickets, points redeemable for later merchandise purchases, or free music downloads. In the example above, the department store might even grant customers with the product discounts on purchases.

Scenario Five—Cause Awareness/Level Playing Field:

Another benefit of the invention is to promote awareness of various causes. This may be accomplished by use of a website and by various links to other sites or sources of information. Of even more importance, Boomerang(™) becomes a new way to revitalize interest in and show what causes are important to a member. As people see a Boomerang product and logo, they will naturally look to see what design is attached to it. Conversations may start about the causes and this is especially true for designs that are not as easily recognizable. Additionally, the Boomerang(™) structure works equally well for very well known causes as for less well know causes. Boomerang(™) in fact becomes a vehicle for learning about various causes. Boomerang(™) also works very well whether the cause is small or large, and is thus a very democratic system.

Another benefit of the invention is the collecting and displaying of encoded parts, such as A-Tags or RFIDs. These tags themselves show the taste and charity of the member. These tags might be released in a decorative and collectable form such as in jewels or metallic jewelry and can be proudly displayed on bracelets, necklaces, key chains, etc., and are available in a variety of styles, materials and pricing. Some customers collect as many tags as possible to show their degree of support. Others collect tags that represent each of the different products produced for each of the different causes.

In an embodiment of the invention, the A-Tags can be used to verify membership and provide access to members having or wearing the A-Tags. As described, these A-Tags would have an RFID, memory spot or similar device and are unique to that member, with the member's information stored by the company operating the system. These A-Tags can then be used for verification purposes or to activate remote access devices to access that member's account and information. Access would be more secure in conjunction with a secondary authorization such as entering a PIN number or fingerprint authorization. The member could access their account for a variety of uses.

One such use would be creating forward interactive screens. On the system's website, the member could create the type of user interface screen he would like to access remotely. This setup could include the screen color and graphics, any sound clips, audio clips, video clips, welcoming messages, the screen's remote capabilities, etc. This all would be accessed at the system's outside terminals, the member's computer or others, an ATM, other payment systems, etc.

Another embodiment of the invention rewards and recognizes customers/members based on their level of support. This information will be available on the website and can be displayed right on the labels of the customers/members purchased products or accessed through the barcodes or A-Tags. Various benefits may inure to customers/members based on their level of support. This increase in levels need not be dependant on the customer/member support for any single cause, which allows customers/members to increase in level more easily.

In embodiments of the present invention, the use of barcodes, RFIDs, memory spots or other similar device allows the system to work with partners in unique ways to encourage additional contributions to the causes and rewards to the member. They also provide an easy way to track members, who they support, contribute to that cause, and provide benefits to the member instantly or through mail or email.

Another embodiment of the present invention is the production of common products such as car flags, lawn flags and car magnets. An inexpensive way to manufacture personalized, individualized, customized or limited edition flags, etc., is by printing on customizable paper, laminating it and attaching it to a flagpole or to magnets. Various items may be added before the lamination process, such as ribbons, fabric, buttons, stars, hair, blood, etc., to create three dimensional flags.

Outside its uses for charities, embodiments of the present invention include possible use for licensed celebrity products. For example, if a fan was buying tickets for a Green Day concert at Giants stadium (Green Day is a popular band), they would be given the option of buying a Green Day flag or T-shirt, which may be designed by Green Day. The product would have among other items the date, venue and name, unique identifying number, unique name/picture and barcode/RFID. Fans could proudly show that they are indeed fans, that they're going to that concert or that after the fact that they've gone to that concert. In the days leading up to the concert, as a concert promotion, radio stations might give away prizes to fans whose vehicles are spotted with these flags, who are wearing T-shirts or who are picked by number. On the day of the concert, these fans would all be driving proudly on their way to the concert with their customized flags, etc. and in the parking lot looking for other vehicles that also have the flags. Certain benefits could be awarded, such as discounts on parking, free drinks, etc. For any given concert a local radio station's name or other advertiser could be added to the products.

Scenario Six—Funeral Car Flags:

Yet another embodiment of the invention includes making inexpensive car flags for funerals. It is typically very difficult for funeral processions to stay together. Cars that are not part of the procession often cannot tell it's a procession and thus cut into it. Also, people in the procession do not have an easy way to tell which cars are in its procession. In the past, cars in a funeral procession turned on their headlights to at least let other cars know that they were part of the procession. Today, many cars in the procession forget to put their headlights on and, far worse, most new cars are equipped with daytime running lights that are on all the time. This renders the car headlight option somewhat obsolete.

A substitute for using headlights has been placing bumper sticker sized banners on the front dash or rear window area. If these can be seen it can potentially help the participants in a procession stay together, but it is difficult to see these banners. Additionally, they are almost of no use in helping other vehicles identify that it is a funeral procession.

The best available option has been flags that are attached to the vehicles in the procession. They are usually made of cloth and are relatively expensive, and usually attached to the vehicles by magnets. Because they are not cheap, they are usually put on by the funeral director at the funeral home and collected by the funeral director at the cemetery. There is some indication that these flags are not in widespread use, and that funeral homes typically do not charge for them and therefore do not profit from using them.

Flags manufactured in accordance with the present invention are relatively inexpensive and are customizable to that particular funeral. Typically, the same information that goes on the cemetery stone may be displayed on the flags: the name of the deceased, birth and death dates, and something about them. In addition, there may also be a picture of the deceased as well, and optionally the name of the funeral home. Thus, the funeral home would initiate the flag order with basic information. The order may simply be complete at this point or the deceased family will have the ability via a user name and a password to get into a website, where they would be able to choose from a variety of templates as to what goes on the flag, change the text, and even download a picture of the deceased.

Because the flags are personalized, they will not only identify the procession to outside vehicles, but will also allow cars within the procession to quickly identify their procession even if there is another procession, as is increasingly likely near the cemetery itself. The personalized flags also create an impressive regal look for the deceased family. Everyone in the procession and possibly others will receive a flag. The flags are also designed to be easily removed from the flagpoles, leaving behind a remembrance of the deceased and the service. Thus, the personalized flags perform multiple functions.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A marketing/fundraising/reward method, comprising the steps of:
   providing to a member a physical product having an incorporated authenticity tag, the authenticity tag comprising a personalized part, a unique identifier encoded in machine-readable form, and a system identification section;
   automatically authenticating the authenticity tag with an electronic device, communicating through the Internet;
   selectively providing a donation to a charity based on the reading, dependent on successful authentication;
   selectively generating an alert dependent on a failed authentication; and
   recording in an automatic database system, information regarding the product, the donation, the personalized part, and the unique identifier.

2. The method according to claim 1, wherein the personalized part comprises at least one of a name, a pseudonym, a symbol or an image.

3. The method according to claim 1, wherein the encoded part is one of a barcode, or a radio-frequency identification tag.

4. The method according to claim 1, wherein the recording is performed over a computer network.

5. The method according to claim 4, wherein the computer network is the Internet and the recording is done using a website.

6. The method according to claim 1, further comprising authenticating the product using the recorded product, donation, personalized part, unique identifier and encoded part information.

7. The method according to claim 6, further comprising:
   generating a web page listing recorded product, donation, personalized part and unique identifier information; and
   displaying the web page.

8. The method according to claim 6, further comprising:
   generating a web page listing the sale, the unique identifier and the encoded part; and printing the web page.

9. The method according to claim 1, further comprising providing an additional donation to the member's chosen charity by another person using the personalized part information and the system identification information.

10. The method according to claim 1, further comprising:
    allowing the member to add to an amount of value associated with their product; and
    updating the recorded information accordingly.

11. The method according to claim 1, further comprising providing rewards to the member by another party based on the authenticity tag information.

12. The method according to claim 1, further comprising:
searching the recorded information authenticating the member; and
when the provision cannot be found, indicating so on a display.

13. The method according to claim 1, wherein the product provided to the member is a funeral car flag, and the personalized information includes the decedent's name.

14. The method according to claim 1, wherein the charity is a for-profit enterprise.

15. A marketing/fundraising/reward system comprising:
a product having an incorporated authenticity tag, the authenticity tag comprising:
a personalized part comprising content provided by a member;
a unique identifier part displaying a unique identifier encoded in machine readable form;
and
a system identification section comprising system identification;
wherein upon provision of the product to the member, a recording is made of the product, the donation, the personalized part, and the unique identifier in an automatic database system, accessible through a web page, for subsequent authentication of the product.

16. The system according to claim 15, wherein the personalized part comprises at least one of a name, a pseudonym, a symbol or an image.

17. The system according to claim 15, wherein the encoded part is one of a barcode, or a radio-frequency identification tag.

18. The system according to claim 15, further comprising a computer network over which the recording is performed.

19. The system according to claim 18, wherein the computer network is the Internet and the recording is done using a website.

20. The system according to claim 15, further comprising authenticating the product using the recorded product, donation, personalized part, unique identifier and encoded part information.

21. The system according to claim 15, further comprising providing an additional donation to the member's chosen charity by another person using the personalized part information and the system identification information.

22. The system according to claim 15, further comprising:
a web page listing recorded product, donation, personalized part and unique identifier information, wherein the web page is displayed.

23. The system according to claim 15, wherein the member is allowed to add to the amount of product, and the recorded information is updated accordingly.

24. The system according to claim 15, wherein rewards are provided to the member by another party based on viewing the authenticity tag information.

25. The system according to claim 15, wherein the recorded information is searched for an authentication of the member; and
when the provision cannot be found, indicating so on a display.

26. The system according to claim 15, wherein the product provided to the member is a funeral car flag, and the personalized information includes the decedent's name.

27. The system according to claim 15, wherein the charity is a for-profit enterprise.

28. A marketing/fundraising/reward method, comprising the steps of:
providing to a member a product having an incorporated authenticity tag, the authenticity tag comprising a personalized part, a unique identifier encoded in machine-readable form comprising a radio frequency identification tag, and a system identification section comprising website information;
providing a donation to a charity of the member's choosing selectively dependent on an automated reading of at least the system identification and an automated authentication of the product;
providing an alert selectively dependent on a failure of an automated authentication; and
recording information regarding the product, the donation, the personalized part, the unique identifier in an automatic database system at the website.

* * * * *